United States Patent
Ayed (10) Patent No.: US 6,407,698 B1
(45) Date of Patent: Jun. 18, 2002

(54) PARKED VEHICLE LOCATOR (76) Inventor: Mourad Ben Ayed, 107 Quebec Ave Suite #3, Toronto, Ontario (CA), M6P 2T3

(*) Notice: Subject to any disclaimer, the term of this patent is extended or adjusted under 35 U.S.C. 154(b) by 0 days.

(21) Appl. No.: 09/325,872

(22) Filed: Jun. 4, 1999

(51) Int. Cl.[7] .............................. G01S 5/02; H04B 7/185
(52) U.S. Cl. ........................... 342/357.07; 342/357.09; 701/213
(58) Field of Search .................. 342/357.09, 357.1, 342/357.07; 701/213

(56) References Cited

U.S. PATENT DOCUMENTS

| | | | | |
|---|---|---|---|---|
| 5,504,482 A | * | 4/1996 | Schreder | 340/995 |
| 5,515,285 A | * | 5/1996 | Garrett, Sr. et al. | 340/990 |
| 5,944,132 A | * | 8/1999 | Davies et al. | 701/215 |
| 6,028,537 A | * | 2/2000 | Suman et al. | 340/988 |

FOREIGN PATENT DOCUMENTS

| | | | |
|---|---|---|---|
| JP | 4-237091 | 9/1992 | G08G/1/01 |

OTHER PUBLICATIONS

English language abstract of Japanese Patent Application No. 4–237091, © 1994, JPO & Japio.

* cited by examiner

Primary Examiner—Theodore M. Blum (57) ABSTRACT

A signal/sensor automatically sends a wireless signal upon sensing that a vehicle has been parked. There is also provided a locator for determining a current location and storing the current location upon receiving the wireless signal. The current location may be determined by accessing a GPS service through a GPS receiver. The current location may further be refined by accessing a DGPS service through a DGPS receiver or a wireless communication device. The locator also comprises a compass and a relative direction and bearing indicator. Upon receiving a user request, the locator determines a new current location and determines a current heading with the compass. Next, a relative direction and bearing to the parked vehicle may be determined by a processor on board the locator or by accessing a remote server through the wireless communication device. Last, the relative bearing and direction to the parked vehicle is conveyed to the user through the indicator. Advantageously, a user's location is stored automatically upon sensing a trigger event without a user's direct intervention. Furthermore, the locator may remain dormant until it senses the trigger event or until a user requests the location of the parked vehicle. As such, the functionality of the present invention may be unobtrusive yet convenient.

3 Claims, 9 Drawing Sheets

PARKED VEHICLE LOCATOR

FIELD OF THE INVENTION

This invention is directed generally to the field of human necessities and more specifically to the field of electronic vehicle finders whereby a vehicle's location is automatically stored upon sensing of a trigger event.

BACKGROUND OF THE INVENTION

Conventional devices for locating parked vehicles use visual attention devices such as flags, banners, pennants or streamers, which are supported from an antenna, as disclosed in U.S. Pat. No. 4,964,360 ("Henry"), or masts with magnetic bases for attaching to vehicle roofs, as disclosed in U.S. Pat. No. 5,388,546 ("Lombard"). However, these systems are not effective at long distances or in bad weather conditions.

Other devices use electronic communication techniques to locate vehicles. U.S. Pat. No. 5,777,580 ("Janky, et. al."), discloses a mobile vehicle location system comprising a location determination system, such as the Global Positional System ("GPS"), in combination with a transceiver/receiver. In Janky, et al. the vehicle location system resides with the target vehicle. While the vehicle location may be determined by remotely communicating with the location system, the user's location cannot be known with the same device when the user is outside the vehicle. Accordingly, Janky et. al is unable to determine the relative position of the vehicle to the user.

Known location determination devices cooperate with location systems such as GPS, Global Navigation System ("GLONASS"), Global Navigation Satellite System ("GNSS") or Long Range Navigation ("LORAN") to provide a user with the latitude and longitude of a location. These devices might be used to direct a user back to a desired location, like the location of a parked vehicle. For instance, if the latitude and longitude of a parked vehicle were input to the navigation instrument, the instrument could readily calculate the distance and bearing to the vehicle. A disadvantage with using these devices to locate a parked vehicle is that the user must know or be able to determine the coordinates of a vehicle and must input this vehicle location into the locator device every time the location of the vehicle changes.

Thus there is a need for a more convenient method and apparatus of locating a user's vehicle.

SUMMARY OF INVENTION

According to one aspect of the invention, there is provided a method for facilitating returning to a parked vehicle location, comprising, responsive to receiving a wireless indication, obtaining position information of a current location, and storing the current location.

According to another aspect of the invention, there is provided an apparatus for facilitating finding of a parked vehicle, comprising a signaller arranged for signalling to indicate a vehicle has been parked, and a locator responsive to the signaller for obtaining and storing a current location upon receiving a signal from the signaller.

According to another aspect of the invention, there is provided an apparatus for facilitating returning to a parked vehicle location comprising, a locator responsive to a wireless signal for storing a current location.

Advantageously, the present invention stores a user's location automatically upon sensing a trigger event.

BRIEF DESCRIPTION OF THE DRAWINGS

The present invention will be more clearly understood after reference to the following detailed specification read in conjunction with the drawings wherein.

Similar reference numerals are used in different figures to denote similar components.

DETAILED DESCRIPTION OF THE PREFERRED EMBODIMENTS

Figure 1:
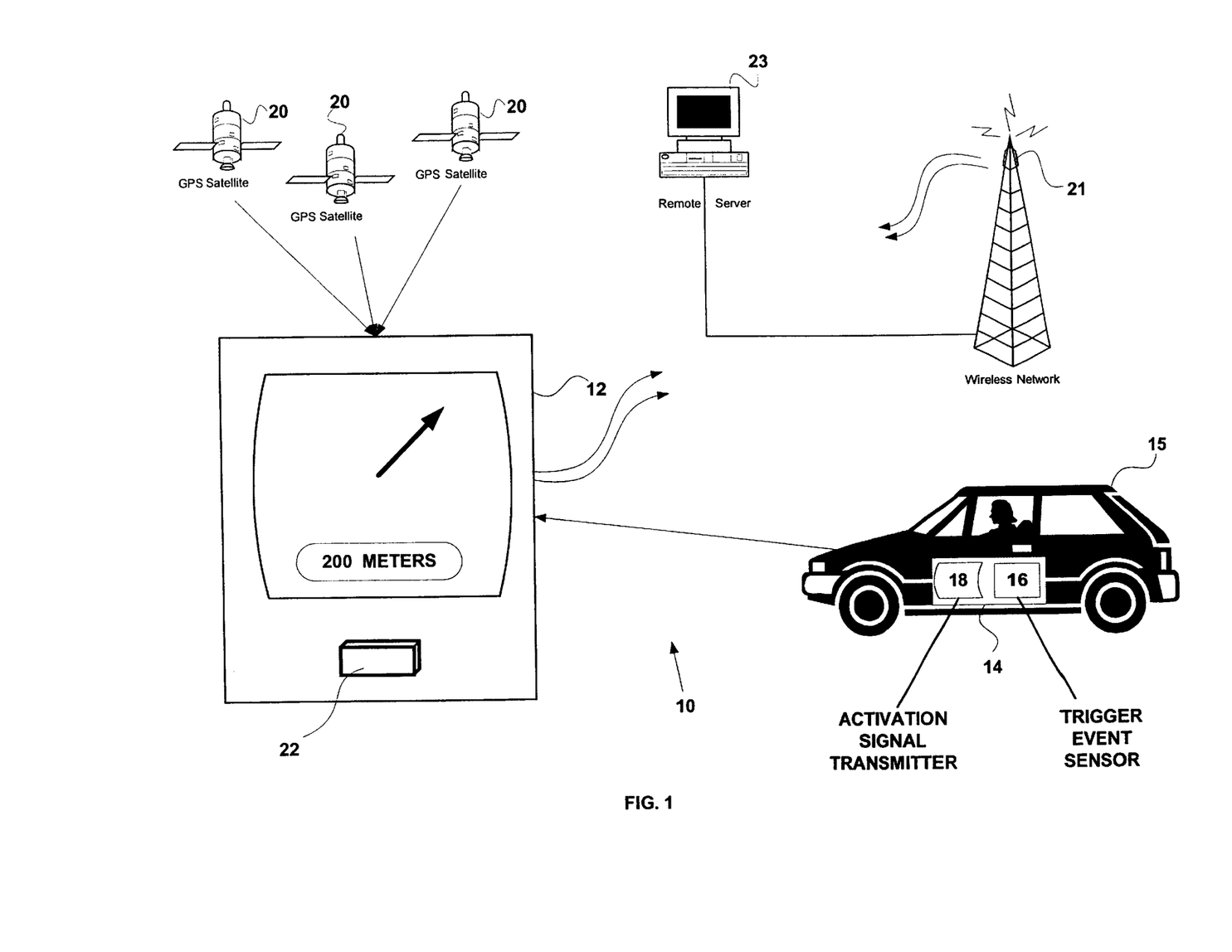
FIG. 1 is a schematic of a parked vehicle locator system.

Referring to FIG. 1, a parked vehicle locator, generally designated 10, includes a portable locator device 12 and a parked vehicle sensor/signal device 14 fixed to a user's vehicle 15. Locator device 12 may be a stand alone device such as a compact hand held unit. Alternatively, locator device 12 may be incorporated with another portable electronic device such as a cellular phone, personal communication device, personal data assistant, pager or portable personal computer.

Parked vehicle sensor/signal device 14 comprises a trigger event sensor 16 interconnected with an activation signal transmitter 18.

Sensor 16 is disposed in a user's vehicle to sense a trigger event signifying that the user's vehicle has been parked. In the preferred embodiment, sensor 16 comprises a photo-electric switch arranged near an interior light of vehicle 15 which, when the driver's door opens, turns on thereby activating the photo-electric switch causing sensor 16 to signify that vehicle 15 has been parked. It will be appreciated that sensor 16 may be a different type of switch and may be positioned in vehicle 15 so that the switch would switch upon shifting an automatic transmission from drive into park, applying the parking brake, turning off the engine, removing the keys from the ignition, opening the driver's side door, or any combination of these events.

Upon sensing an appropriate trigger event, sensor 16 prompts activation signal transmitter 18 to wirelessly send an identifiable short range signal to portable location device 12. It will be understood that only a short range signal is needed to contact portable location device 12 since the user is expected to be in (or near) the vehicle with portable locator device 12 when the car is parked. It will also be understood that sensor 16 and activation signal transmitter 18 are to be provided with a power supply (not shown).

Although the system described employs an activation signal transmitter which transmits a wireless activation signal, it is contemplated that portable locator 12 could also be removably attached to a cradle (not shown) that is connected to activation signal transmitter 18. In such a case, it would not be necessary for the activation signal to be wireless.

In order to prevent locator device 12 from being prompted by other signal transmitters, activation signal transmitter 18 may modulate the activation signal with a digital marker sequence that only the complementary portable locator device 12 will recognize.

As will be explained further, the signal sent by activation signal transmitter 18 may prompt locator device 12 to cooperate with a GPS 20 to determine the vehicle's current location and store this information for future reference.

It will be understood that GPS 20 may alternatively be a GLONASS, LORAN, GNSS, or any other commercially available service, or combination of services, that provides global position information.

Figure 2:
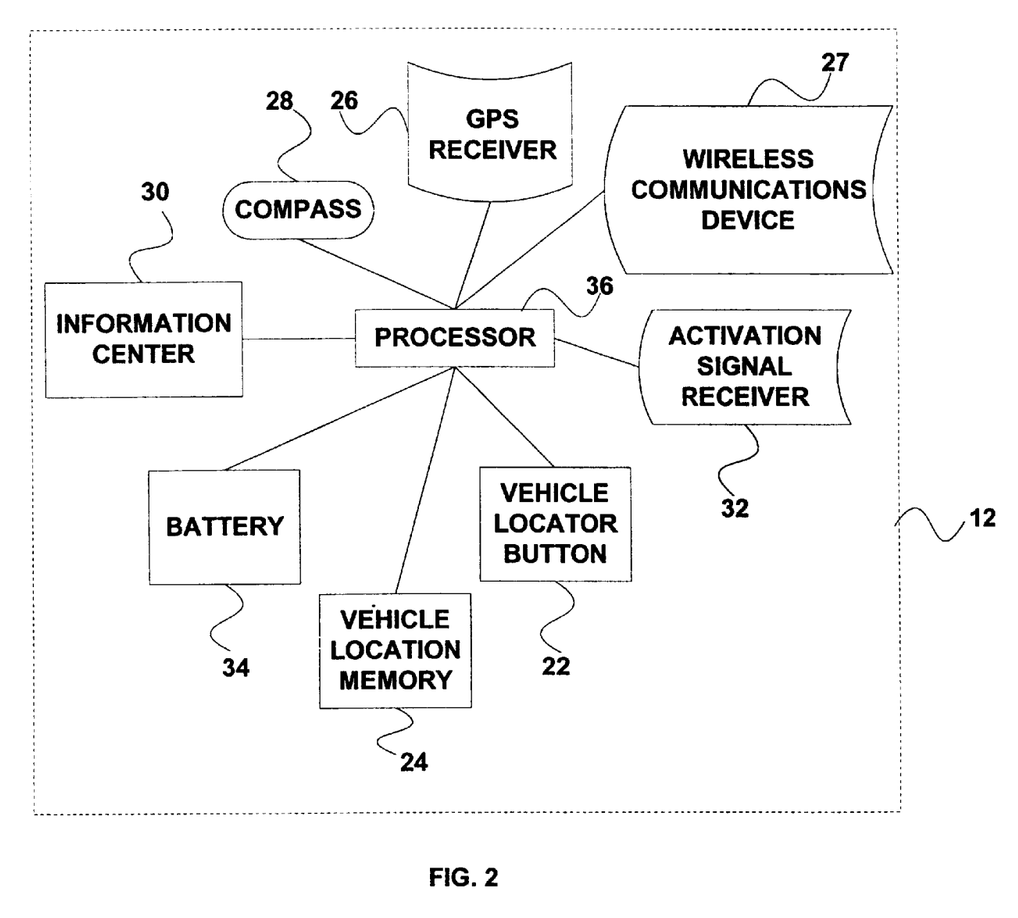
FIG. 2 is a block diagram of a portable locator made in accordance with this invention.

Referring now to FIG. 2, in one embodiment, portable location device 12 comprises a processor 36 interconnected with an input from a vehicle locator button 22, memory 24, a GPS receiver 26, a wireless communication device 27, a compass 28, an information centre 30, a battery 34, and a activation signal receiver 32.

By pressing vehicle locator button 22 a user may request that a current location be stored or that bearing and distance information to a previously stored location be provided. Optionally, vehicle locator button 22 may be replaced by any suitable type of user input device such as a keyboard, a pointing device (e.g. mouse), a touch sensitive display, a voice recognition system, a stylus or any combination of such devices.

Memory 24, which may be any standard writeable memory, stores parked vehicle, or other location information.

GPS receiver 26 cooperates with a publicly available GPS 20 (FIG. 1) to determine the user's current location. It will be understood that the reception of GPS receiver 26 may be improved by providing the user's vehicle with a wireless GPS antenna (not shown) to relay GPS signals inside the vehicle.

Wireless communication device 27 communicates with wireless network 21 (FIG. 1) to obtain DGPS correction data to improve the accuracy of the GPS data so that the user's current or stored location may be determined with more precision than could be obtained by using GPS alone. The DGPS service may be available from a satellite, a radio station, a cellular network or any other wireless network. In addition, wireless communication device 27 may access remote server 23 through wireless network 21 to store information and to determine relative bearing and distance for locator device 12 to reduce the hardware requirements of the locator. Wireless communication device 27 may be a cellular phone, a personal communication device, a pager, a DGPS receiver or any other wireless communication device capable of accessing the wireless networks mentioned above.

Compass 28 determines the user's current heading.

Information centre 30 conveys bearing and distance information to the user. Information centre 30 is preferably a liquid crystal display ("LCD") capable of displaying a digital pointer and alphanumeric readout of distance, as shown in FIG. 1. However, information centre 30 may also be a cathode ray tube, a plasma discharge display, a compact speaker or any other audible or visual means capable of conveying information to the user.

Battery 34 provides power to some of the components of portable location device 12. It will be understood that battery 34 may be a nickel-cadmium, lithium, alkaline or nickel-hydride battery or any other portable source of electric power.

Activation signal receiver 32 listens for an activation signal from activation signal transmitter 18. It will be understood that activation signal receiver may be any type of receiver capable of receiving the signal generated by activation signal transmitter 18.

As described hereafter, processor 36 communicates with the components of locator 12 and determines relative bearing and distance to a stored location by comparing the current location and heading with the stored location. However, remote server 23 may alternatively perform the function of determining relative bearing and distance.

When portable locator device 12 is not in operation it remains in a dormant state ("sleep-mode") to conserve the energy of battery 34.

Figure 3A:
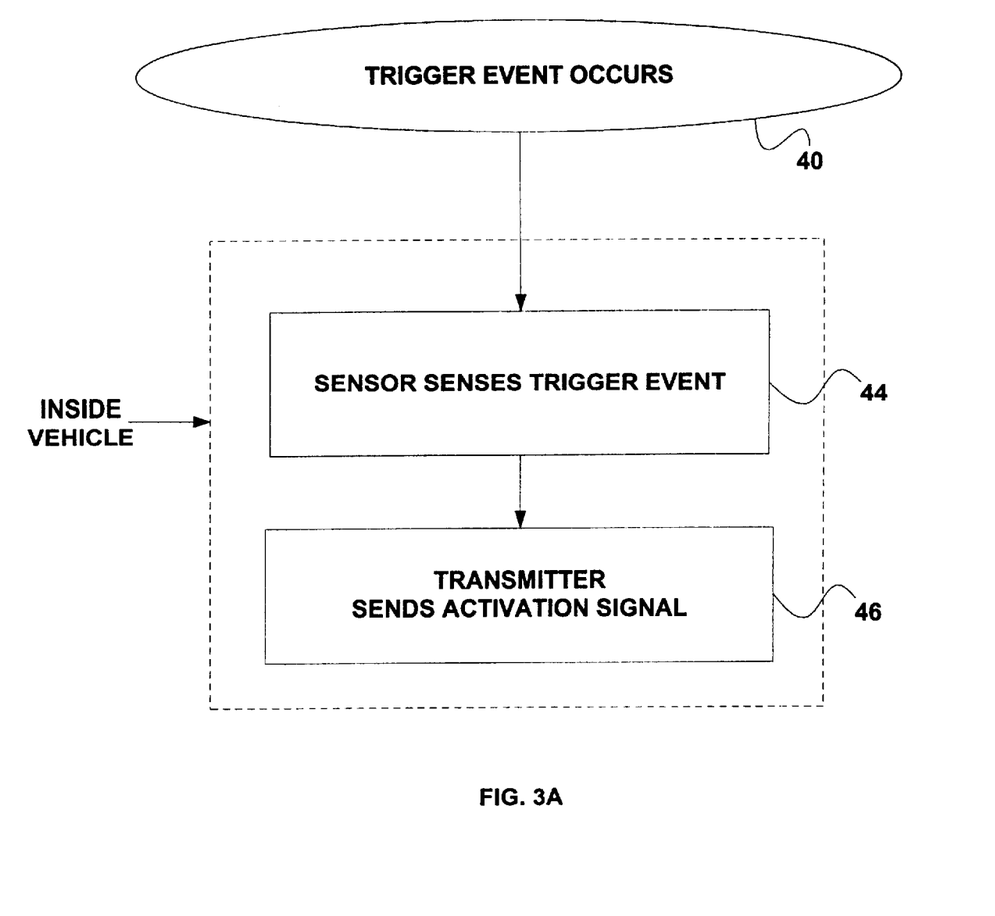
FIG. 3a is a flowchart illustrating the steps involved in sending a signal to the portable locator.
Figure 3B:
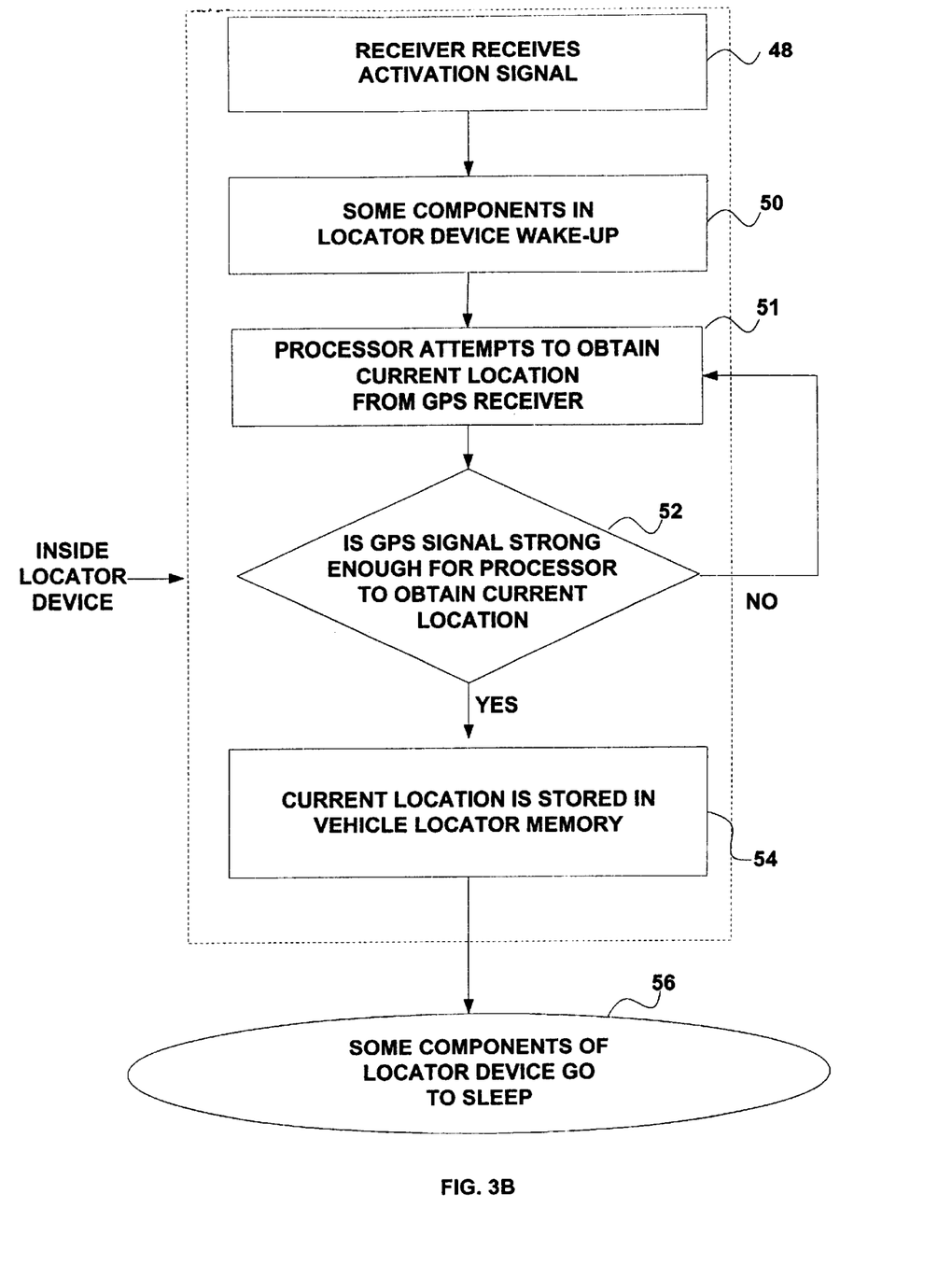
FIG. 3b is a flowchart illustrating the steps involved in storing a parked vehicle location in the portable locator.

FIGS. 3a and 3b illustrate the steps involved in storing a parked vehicle location.

Turning now to FIG. 3a, which illustrates the operation of sensor/signal device 14, along with FIGS. 1 and 2, in step 44 a trigger event 40 (e.g. the illumination of the vehicle's interior light) is sensed by trigger event sensor 16. In step 46, trigger event sensor 16 prompts activation signal transmitter 18 to send a short range radio frequency signal.

Turning now to FIG. 3b, which illustrates the operation of portable locator 12, upon receipt of the activation signal in step 48, activation signal receiver 32 prompts some components in portable locator 12 to wake up in step 50. After waking up, in step 51 processor 36 verifies the signal (e.g. checks a digital sequence modulation on the carrier wave with a stored sequence) then prompts GPS receiver 26 to attempt to obtain the portable locator's current location, which will correspond to the parked vehicle location (because portable locator 12 must be in or near the vehicle to be within the range of the activation signal when the vehicle is parked). However, sometimes the GPS signal is blocked by buildings or is too weak for GPS receiver 26 to obtain. If processor 36 is unable to obtain a current location in step 52 it repeats step 51. After a set number of failed attempts (not shown) locator 12 may warn the user with a signal signifying that it was unable to obtain a current location. In step 54 the portable locator's current location is stored in vehicle location memory 24 after which, in step 56, some the components of portable locator 12 return to sleep-mode to conserve energy.

Figure 4:
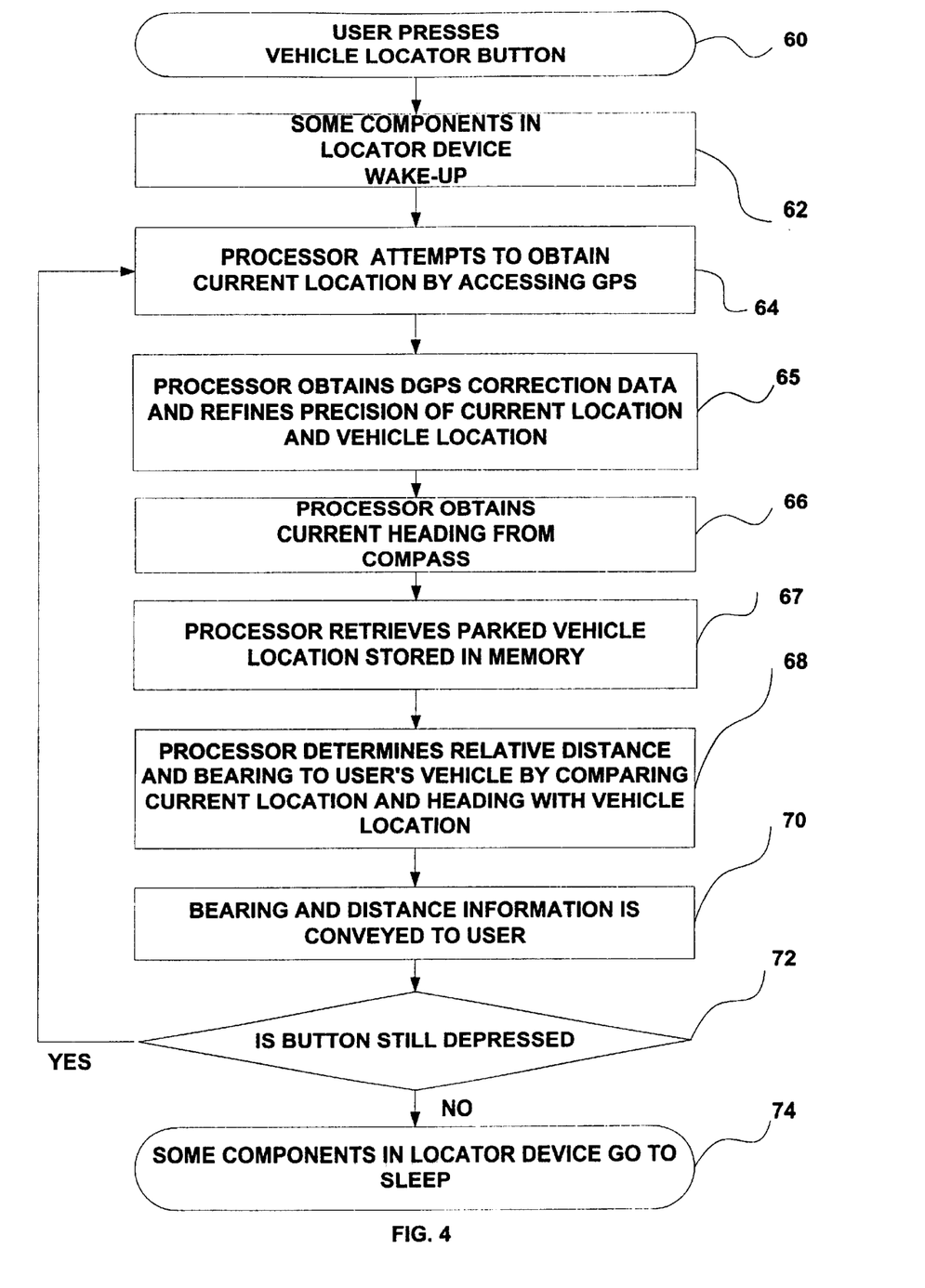
FIG. 4 is a flowchart illustrating the steps involved in conveying parked vehicle location directions to a user.

FIG. 4 illustrates a flow chart of the steps involved in locator 12 conveying parked vehicle location directions to a user. Referring to FIGS. 1, 2 and 4, in step 60 a user presses vehicle locator button 22 which prompts some components in portable vehicle locator 12 to wake up in step 62. Upon waking up, in step 64 processor 36 performs steps 51 and 52 as set out in FIG. 3b and attempts to obtain the user's current location by accessing GPS 20. In step 65, processor 36 prompts wireless communication device 27 to access a DGPS service to obtain DGPS correction data for both the user's current location and parked vehicle location stored in memory 24. Processor 36 then utilizes this DGPS correction data to refine the precision of the user's current location and parked vehicle location. Next, processor 36 in step 66 obtains the locator's current heading from compass 28 and in step 67 retrieves the parked vehicle location stored in memory 24. Next, in step 68 processor 36 determines the relative distance and bearing to the user's parked vehicle by comparing the current location and heading with the parked vehicle location stored in vehicle location memory 22. In step 70 the relative distance and bearing information are conveyed to the user through information centre 30. In step 72, processor 36 determines whether vehicle locator button 22 is still depressed after a prescribed period of time. If vehicle locator button 22 is still depressed processor 36 returns to step 64 to provide the user with updated relative distance and bearing information. In this way, if the user keeps vehicle locator button 22 depressed the user will receive continuous periodic updates of relative distance and bearing information without having to press vehicle locator button 22 repetitively. If vehicle locator button 22 is no longer depressed after the prescribed period of time then some of the components return to sleep mode in step 74.

Figure 5:
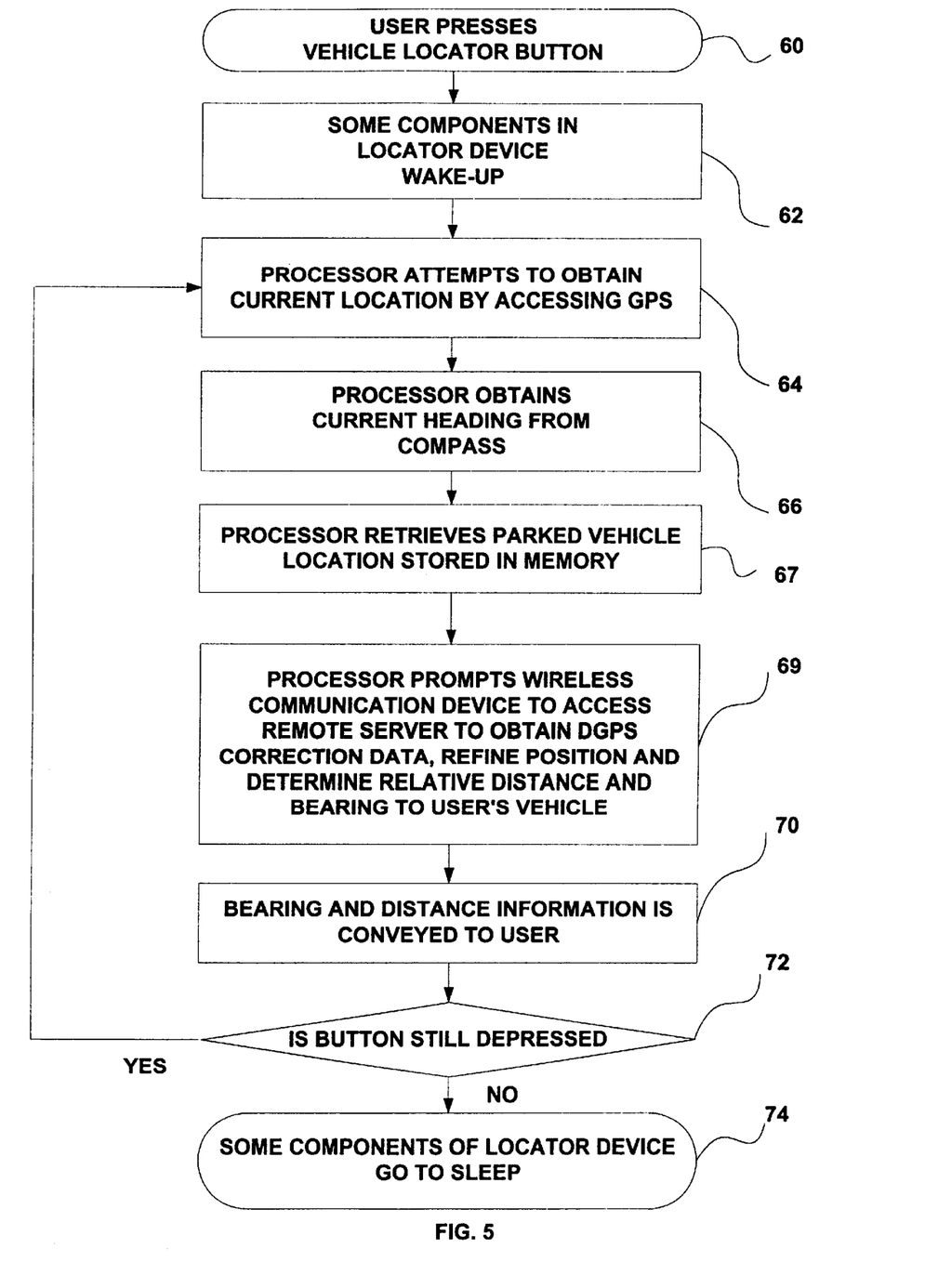
FIG. 5 is a flow chart illustrating alternative steps involved in conveying parked vehicle location directions to a user whereby some functions are performed remotely.

In an alternative embodiment, illustrated in FIG. 5, the function of determining relative bearing and distance as well as refining position precision using DGPS correction data, performed by processor 36, may be performed by remote server 23 instead. Accordingly, with reference to step 69 in FIG. 5, processor 36 prompts wireless communication device 27 to access remote server 23 to obtain DGPS correction data, refine position and determine relative distance and bearing the user's vehicle.

Figure 6:
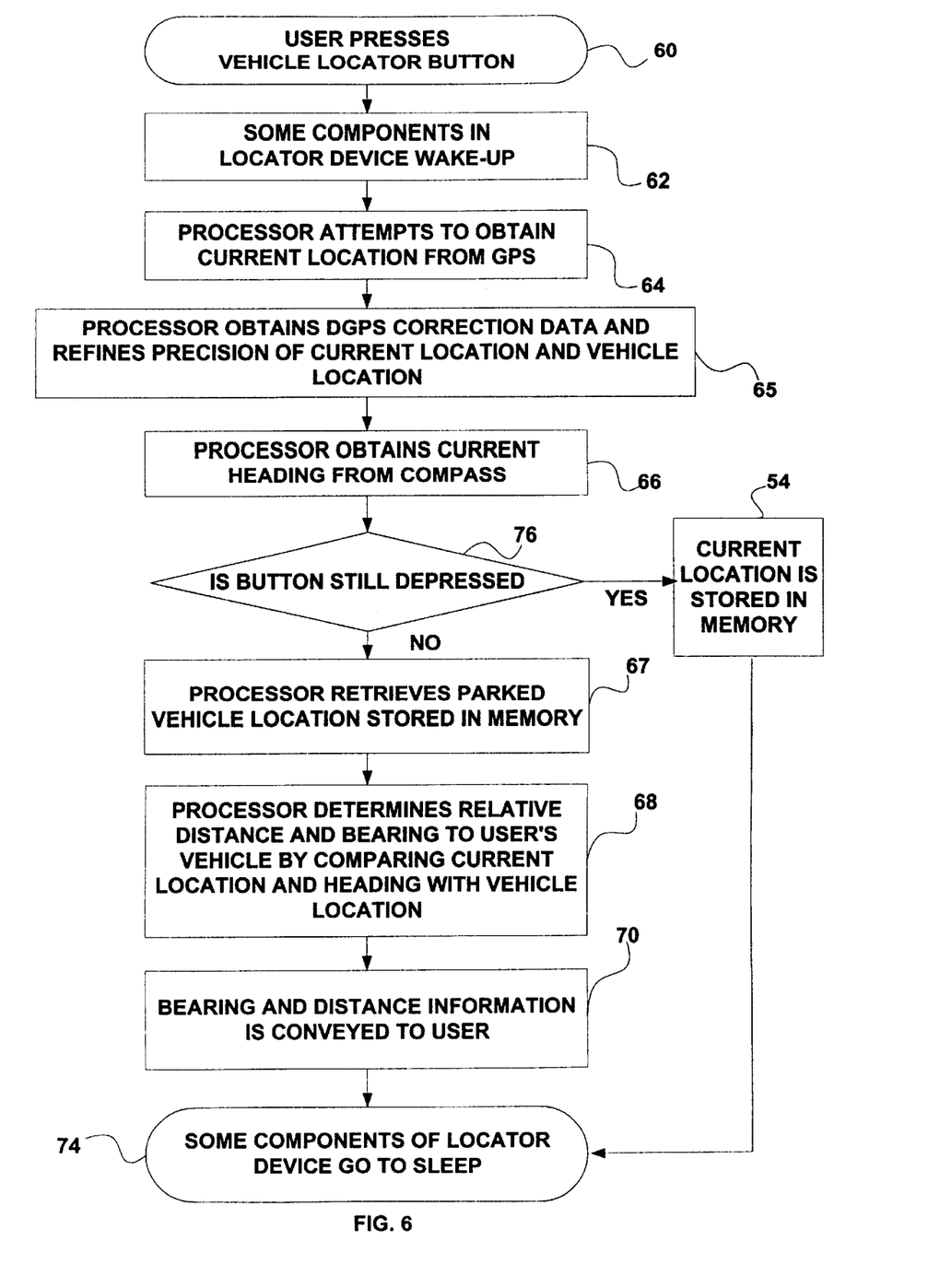
FIG. 6 is a flow chart illustrating further alternative steps involved in conveying directions to a stored location to a user whereby a user may store locations other than that of the parked vehicle.

In another embodiment, illustrated in FIG. 6, if the vehicle locator button 22 is still depressed after a prescribed period of time in step 76, instead of updating the relative distance and bearing information and conveying this information to the user, as previously described in steps 67, 68 and 70, processor 36 may proceed to step 54 and store the locator's current location by overwriting the parked vehicle location already stored in memory 24. In this alternative embodiment, the user can press vehicle locator button 22 for a short period of time to obtain relative distance and bearing information and can press the vehicle locator button 22 for an extended period of time to store a new current location in memory 24. In this way, the user can utilise memory 24 to store locations other than the location of the user's parked car. However, with only one memory location, once the new current location is stored in memory 24, the location of the parked vehicle will no longer be available.

Figure 7:
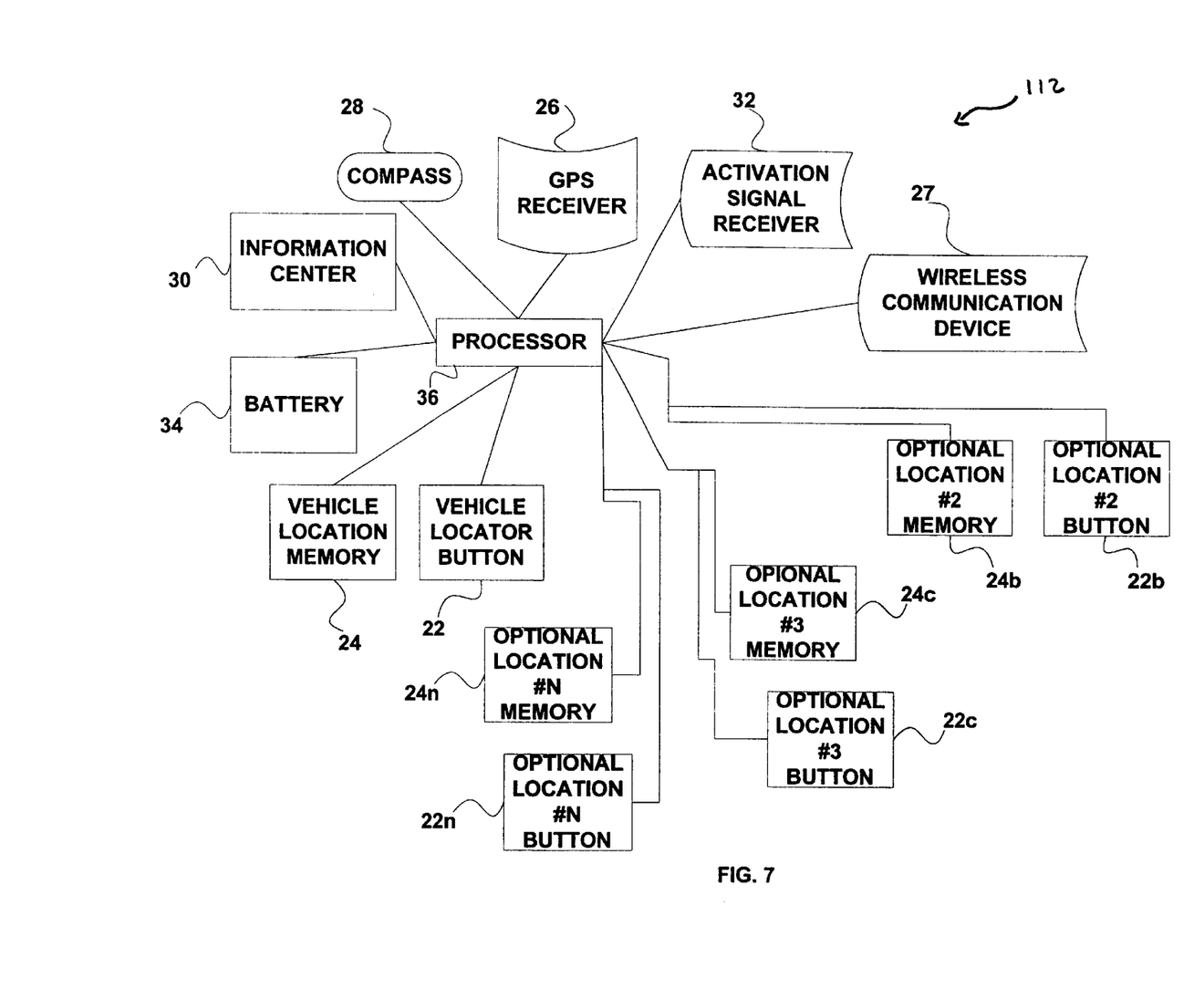
FIG. 7 is a block diagram of a portable locator made in accordance with another embodiment of this invention.

With reference to FIG. 7, a modified portable locator 112 is provided with optional memory registers 24b, 24c and 24n and corresponding optional location buttons 22b, 22c and 22n. The steps set out in FIG. 5 are followed mutatis mutandis, when a user presses one of the optional locator buttons 22b, 22c, or 22n. More particularly, when the user presses one such button for a short period of time, relative distance and bearing information is obtained between the locator's current location and the stored location in the optional memory register 24b, 24c or 24n which corresponds to the button which was pushed. The user may also press one of the optional locator buttons 22b, 22c or 22n for an extended period of time to store a new current location in corresponding memory register 24b, 24c, 24n by overwriting the location that was previously stored in that memory register. In this way, vehicle location memory 24 remains devoted to storing the user's parked vehicle location but the user may use other memory registers 24b, 24c, 24n to store other locations which may be of interest to the user.

Figure 8:
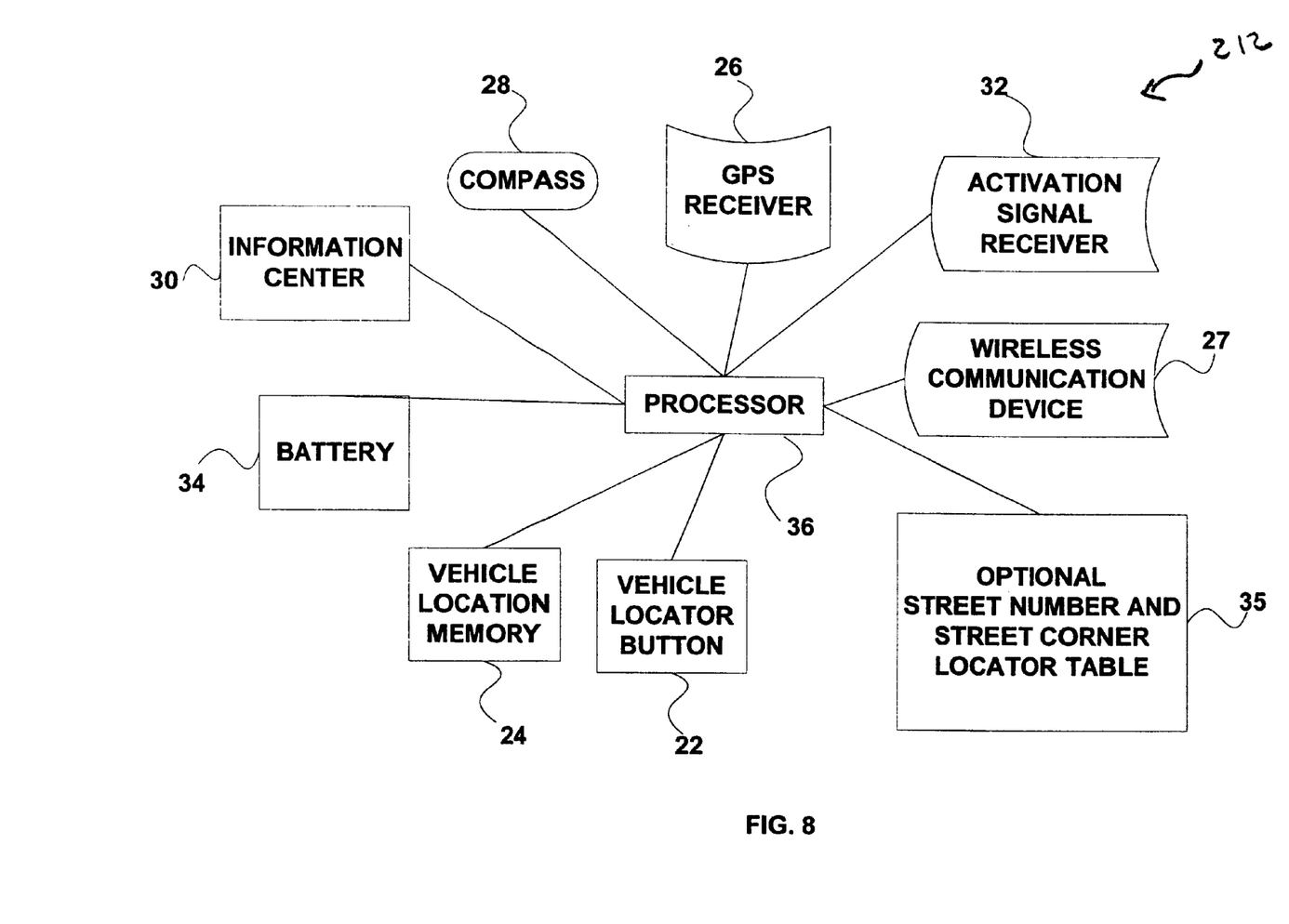
FIG. 8 is a block diagram of a portable locator made in accordance with further embodiment of this invention.

With reference to FIG. 8, in another embodiment a modified portable locator 212, as shown in FIG. 2, may be provided with an optional street number and street corner locator table 35. Locator table 35 tabulates static terrestrial features, such as addresses and street corners, with their corresponding GPS coordinates. With portable locator 212, when a user requests relative bearing and distance to a stored location, in addition to the steps previously provided, processor 36 may also determine and display the street address or corner nearest to the stored location by cross-referencing the GPS coordinates of the stored location with the nearest GPS coordinate stored in locator table 35. Although FIG. 8 shows that locator table 35 is stored in portable locator 212, it may also be stored in remote server 23 where it may be accessed through wireless network 21 by wireless communication device 27.

Although the system described relies upon information from a DGPS in addition to a GPS, where the information from the primary positioning system (e.g. a GPS) is considered sufficiently accurate, no correction data is required. In such a case, wireless communication device 21 may be optional.

Numerous other modifications, variations, and adaptations may be made to the particular embodiments of the invention described above without departing from the scope of the invention, which is defined in the claims.

What is claimed is:

1. A method for facilitating returning to a parked vehicle location using a single global positioning system, comprising:

sensing an occurrence that indicates that a vehicle has gone to a parked state, and upon said sensing a signaller wirelessly sending an activation signal, said occurrence selected from the group consisting of turning a vehicle interior light on or off, turning an engine on or off, opening or closing a door, and shifting a gear shift to the park position from another position, and;

responsive to receiving the wireless activation signal at a portable locator device, obtaining first position information for the portable locator device at the time of receipt of the wireless activation signal by accessing a global positioning system from the portable locator, storing the first position information for the portable locator device for later use in a memory onboard the portable locator device, and upon the portable locator device receiving a user request for locating the vehicle, obtaining second position information for the portable locator, obtaining the bearing information of the portable locator, comparing the second position information and bearing with the stored first position information, and determining bearing and distance to the first position location with respect to the second position location.

2. A locator system having a single global positioning receiver, comprising:

a sensing device for sensing an occurrence selected from the group consisting of turning a vehicle interior light on or off, turning an engine on or off, opening or closing a door, and shifting a gear shift to the park position from another position, a transmitter for sending a wireless activation signal upon said sensing device sensing an occurrence, and a portable locator device, comprising a first wireless receiver, a memory, a second wireless receiver, a manual activator, a compass, a processor, and an output device, wherein:

said first wireless receiver is a global positioning receiver for receiving navigational coordinates from a global positioning satellite system that correspond to the location of said locator device, said memory stores a first set of navigational coordinates from said first wireless receiver in response to said second wireless receiver receiving a wireless activation signal from said transmitter, said manual activator causes said processor to compare a first set of navigational coordinates stored in said memory with a second set of navigational coordinates received from said first wireless receiver and with compass bearings of said locator device, and output the results of the comparison to said output device, wherein said portable locator device provides directional information from a second location corresponding to a second set of navigational coordinates to a first location corresponding to a first set of navigational coordinates.

3. A unitary portable locator device having a single global positioning receiver, said device for use with a system that utilizes only said single global positioning receiver and comprises a sensing device for sensing an occurrence selected from the group consisting of turning a vehicle interior light on or off, turning an engine on or off, opening or closing a door, and shifting a gear shift to the park position from another position, and a transmitter for sending a wireless activation signal upon said sensing device sensing an occurrence, said portable locator device, comprising:

a first wireless receiver, a memory, a second wireless receiver, a manual activator, a compass, a processor, and an output device, wherein:

said portable locator device is unitary, and said first wireless receiver is a global positioning receiver for receiving navigational coordinates from a global positioning satellite system that correspond to the location of said locator device, said memory stores a first set of navigational coordinates from said first wireless receiver in response to said second wireless receiver receiving a wireless activation signal from a corresponding transmitter, said manual activator when activated causes said processor to compare a first set of navigational coordinates stored in said memory with a second set of navigational coordinates received from said first wireless receiver and with compass bearings of said locator device, and output the results of the comparison to said output device, wherein when said manual activator is activated, said locator device provides directional information from a second location corresponding to said second set of navigational coordinates to a first location corresponding to said first set of navigational coordinates, wherein said first set and said second set of navigational coordinates are provided by said first wireless receiver.

\* \* \* \* \*